United States Patent [19]

Adams et al.

[11] Patent Number: 5,237,680

[45] Date of Patent: Aug. 17, 1993

[54] METHOD FOR INCREMENTAL RENAME PROPAGATION BETWEEN HIERARCHICAL FILE NAME SPACES

[75] Inventors: Evan W. Adams, San Leandro; Claeton J. Giordano, Palo Alto, both of Calif.

[73] Assignee: Sun Microsystems, Inc., Mountain View, Calif.

[21] Appl. No.: 589,335

[22] Filed: Sep. 27, 1990

[51] Int. Cl.$^5$ .............................................. G06F 15/16
[52] U.S. Cl. .................... 395/600; 364/DIG. 1; 364/222.81; 364/282.3; 364/282.4; 364/283.1; 364/283.2
[58] Field of Search ................. 395/600; 364/DIG. 1, 364/DIG. 2

[56] References Cited

U.S. PATENT DOCUMENTS

| | | | |
|---|---|---|---|
| 4,951,192 | 8/1990 | Chase, Jr. et al. | 395/700 |
| 4,999,766 | 3/1991 | Peters et al. | 395/600 |
| 5,113,519 | 5/1992 | Johnson et al. | 395/600 |
| 5,151,989 | 9/1992 | Johnson et al. | 395/600 |

OTHER PUBLICATIONS

The Network Software Environment, Release 1.0, Sun Microsystems, Inc., Mountain View, Calif., pp. 3–11, 47–68.

*Primary Examiner*—Thomas C. Lee
*Assistant Examiner*—Matthew C. Fagan
*Attorney, Agent, or Firm*—Blakely Sokoloff Taylor & Zafman

[57] ABSTRACT

A rename tracking and propagation facility propagates renames, executed in multiple isolated file system name spaces (FSNS), to a remote FSNS on a per object basis without corruption of the remote FSNS names. In propagating an object's rename, the smallest set of additional object's renames which must be applied in the remote FSNS in order to apply the object's rename in the remote FSNS is determined. The set of renames is applied in the correct order, in the remote FSNS, accounting for those renames already propagated to the remote FSNS. A record of renames executed in a FSNS is utilized to determine which renames are to propagated. To accommodate parallel development (multiple users modifying part of the fill system all the time without explicit locking), name collisions in the remote FSNS are detected and resolved. These sets of renames are constructed such that they can be applied to the remote FSNS in any order. Though this may result in the application of renames in a different order in the remote FSNS, the application of renames in the remote FSNS succeeds and ultimately the remote FSNS will be exactly the same as the local FSNS. Since these sets of renames commute, objects can be propagated between FSNS's in any order and at any time without corrupting the remote FSNS.

2 Claims, 4 Drawing Sheets

SIMPLE RENAME:

BEFORE RENAMES:

LOCAL FSNS            REMOTE FSNS

A(1)                        A(1)

RENAMES:

a) A -> B (1)

b) B -> C (1)

AFTER RENAMES:

CLEARANCE RENAME:

BEFORE RENAMES:

LOCAL FSNS            REMOTE FSNS

Y(1)   X(2)           Y(1)   X(2)

RENAMES:

a) Y -> Z (1)

b) X -> Y (2)

AFTER RENAMES:

DIRECTORY RENAME:

BEFORE RENAMES:

LOCAL FSNS

REMOTE FSNS

RENAMES:

a) D1/Y -> D1/Z    (2)

b) D1/ -> D2/      (1)

c) D2/A -> D2/B    (3)

AFTER RENAMES:

RENAME CONFLICT:

BEFORE RENAMES:

LOCAL FSNS                     REMOTE FSNS

A(1)                                     A(1)

RENAMES:

a) A -> Y (1)                   b) A -> Z (1)

AFTER RENAMES:

COLLISION:

BEFORE RENAMES:

LOCAL FSNS                     REMOTE FSNS

A (1)                                  A(1)    B(2)

RENAMES:

a) A -> B (1)

AFTER RENAMES:

METHOD FOR INCREMENTAL RENAME PROPAGATION BETWEEN HIERARCHICAL FILE NAME SPACES

BACKGROUND OF THE INVENTION

1. Field of the Invention

The invention relates to the field of software development environments, and in particular, to the management of name consistency for objects in isolated file system name spaces.

2. Art Background

Traditional software development environments manage two types of objects, files and directories, in a hierarchical file system. Directories are known as container objects which contain files and other directories; they form a hierarchical file system name space (FSNS). Every object has both a contents and name attribute. Object names are unique in that no two objects may occupy the same name in a FSNS at the same time,. To rename an object is to change the name associated with that object in a FSNS. Both files and directories can be renamed, and renames which have been executed in one isolated FSNS can be propagated to another distinct but related FSNS automatically. Since an arbitrary object rename can be propagated from one FSNS to another FSNS, it is desirable to apply only those renames from the first FSNS to the second which are relevant to the object, regardless of other renames of other objects in the first FSNS.

Renames are propagated from one FSNS to another as follows: A time ordered list or renames was maintained on a per-FSNS basis. For each rename, a record of the unique id (identification) of the object, the time of the rename, and the old and new names of the object was made, respectively. To propagate an object from the local FSNS to a remote FSNS, both the contents and the name are "copied" from the local FSNS to the remote FSNS. To "copy" the name, all of the renames recorded for that object's unique id in the local FSNS's rename listed are applied to that of the object in the remote FSNS, thereby translating the name of the object in the remote FSNS to that of the local. The format of a rename list is: Rename ID) Old Name→New Name (Object ID. ) For example, the following renames are executed in the local FSNS:

a) A→B (1)
b) B→C (1)

When object (1) is propagated from the local to the remote FSNS, renames a) and b) are applied to object 1 in the remote FSNS, in that order. The contents of object 1 are then copied from the local FSNS to the remote FSNS. Release 1.0 of the Network Software Environment (NSE) from Sun Microsystems, Inc., of Mountian View, Calif. propagated object renames in this fashion.

The prior art approach had several shortcomings. In the first two examples, there are initially two identical FSNS's containing the same objects with the same names. The "clearance" problem of renaming an object occurs because the final name of an object undergoing a rename must be available, i.e. not occupied by some other object. For example, if a local FSNS has two files named X and Y, a rename of Y and Z, respectively, must be executed in the following order.

a) Y→Z (1)
b) X→Y (2)

The local FSNS now has two files, named Y and Z. Note that rename a) had to be executed before rename b) in order to make available (or "clear") the name Y in the FSNS. Rename a) is considered a "clearance" rename. If object 2 named Y, Y(2), (originally X(2)) is propagated to the remote FSNS, then Y(2)'s rename b) should be applied to the remote FSNS. However, the remote FSNS still has files X(2) and Y(1), and applying rename b) will collide with Y(1), and the propagation will fail.

Directory renames present two problems. First, if an object rename is propagated to the remote FSNS before the remote FSNS has received the rename for the directory containing the object, that object rename fails because the object rename refers to a directory name not yet defined in the remote FSNS. Second, once a directory rename has been applied in the remote FSNS, renames of other objects contained in the renamed directory may fail when applied in the remote FSNS because they refer to a directory by its original name, depending on whether or not the renames were executed before or after the directory rename in the local FSNS. For example:

a) D1/Y→D1/Z (2)
b) D1/→D2/ (1)
c) D2/A→D2/B (3)

Originally there were two files D1/Y and D1/A in the local FSNS. This sequence of renames results in D2/Z and D2/B in the local FSNS. If D2/B is propagated first, then its rename c) will fail when applied in the remote FSNS because it has not yet been renamed D2 in the remote FSNS. In a second scenario, assume that renames b) and c) were successively propagated to the remote FSNS. In order to propagate object (2) to the remote FSNS, the rename a) would have to be applied in the remote FSNS. But rename a) would fail because it refers to directory (1) by is original name D1, and the remote FSNS has renamed it D2.

The next two problems also involve the propagation of objects from one FSNS to another. But in these examples the local and remote FSNS's, though similar, initially differ in the number and/or names of the objects.

A rename "conflict" occurs when the same object is renamed in different FSNS's. If the same object is renamed in the local and remote FSNS, then propagation of the object from the local to the remote FSNS will fail because the object in the remote FSNS does not have the original name of the object in local FSNS. For example:

| Local FSNS | Remote FSNS |
| --- | --- |
| a) A → Y (1) | b) A → Z (1) |

When propagating object (1) to the remote FSNS, rename a) will fail because in the remote FSNS object (1) is not named "A".

A rename "collision" occurs when the object is propagated from the local to the remote FSNS when an object in the local FSNS is renamed to a name occupied by another object in the remote FSNS and this second object does not exist in the local FSNS. For example, object A(1) exists in both the local and remote FSNS, and object B(2) exists only in the remote FSNS and is unknown in the local FSNS. The following rename is executed;

| Local FSNS | Remote FSNS |
|---|---|
| a) A → B (1) | |

When object (1) is propagated from the local to the remote FSNS, rename a) will fail because it will "collide" with object B(2) in the remote FSNS.

SUMMARY OF THE INVENTION

The invention is a rename tracking and propagation facility. This facility propagates renames, executed in multiple isolated name spaces, to a remote FSNS's on a per object basis without corruption of the remote FSNS's. In addition to propagating renames of the object, this facility determines the smallest set of other objects renames which must be applied in the remote FSNS in order to apply the object's renames in the remote FSNS and applies this set of renames in the correct order, in the remote FSNS, accounting for those renames already propagated to the remote FSNS. The facility relies on a record of renames executed in a FSNS to determine which renames are to be propagated. To accommodate parallel development (multiple users modifying part of the file system all the time without explicit locking), name collisions due to renames and other objects in the remote FSNS's are detected and resolved. These sets of renames are constructed such that they can be applied to the remote FSNS in any order. Though this may result in the application of renames in a different order in the remote FSNS, the application of renames in the remote FSNS will succeed and ultimately the remote FSNS will be exactly the same as the local FSNS. Since these sets of renames commute, objects can be propagated between FSNS's in any order and at any time without corrupting the remote FSNS.

BRIEF DESCRIPTION OF THE DRAWINGS

FIG. 1 illustrate the contents of a rename list for a local FSNS and a remote FSNS, respectively, before and after applying the present invention to a simple rename task.

FIG. 2 illustrate the contents of a rename list for a local FSNS and a remote FSNS, respectively, before and after applying the present invention to a clearance rename problem.

FIG. 4 illustrates the contents of a rename list for a local FSNS and a remote FSNS, respectively, before and after applying the present invention to a rename conflict problem.

FIG. 5 illustrates the contents of a rename list for a local FSNS and a remote FSNS, respectively, before and after applying the present invention to a collision problem.

NOTATION AND NOMENCLATURE

Figure 3:
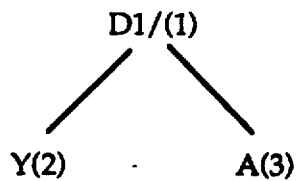
FIG. 3 illustrate the contents of a rename list for a local FSNS and a remote FSNS, respectively, before and after applying the present invention to a directory rename problem.
Figure 3:
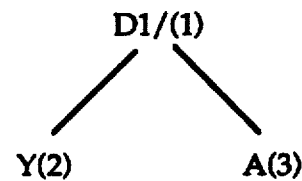
Figure 3:
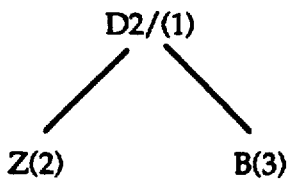
Figure 3:
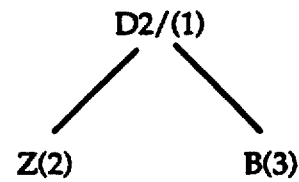

The detailed description that follows is presented largely in terms of algorithms and symbolic representations of operations on data bits and data structures within a computer memory. These algorithmic descriptions and representations are the means used by those skilled in the data processing arts to most effectively convey in substance of their work to others skilled in the art.

An algorithm is here, and generally, conceived to be a self-consistent sequence of steps leading to a desired result. These steps are those requiring physical manipulation of physical quantities. Usually, though not necessary, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

The rename facility of the preferred embodiment of the present invention is imbedded in Release 1.2 of the Network Software Environment (NSE) from Sun Microsystems, Inc. Refer to "The Network Software Environment", Sun Technical Report FE197-0 (1989), part number: 800-3295-10. The rename facility is implemented as part of the copy-modify-merge paradigm of NSE. By copy modify merge, the present invention refers to the step of acquiring an object (a copy of a file system of interest) from a remote (parent or remote) environment into a private and isolated (child or local) environment where the user modifies the object in the private environment. The modification is merged in the local environment instead of the remote environment. When an object is propagated between two FSNS, the NSE propagates both the objects contents and name.

Associated with and maintained for each FSNS is a rename list of the form:

Unique-Object-ID Old-name New-name time-of-rename.

To propagate the name attribute of an object from one FSNS to another, the following recursive algorithm is applied to the local FSNS rename list to determine the rename "set" for the object, the list of renames to be applied in the remote FSNS. Once defined, each rename in the rename set is applied to the remote FSNS. The renames in an object's rename set are applied in the order in which they were executed in the local FSNS. FIG. 1 illustrates the contents of a rename list for a local FSNS and a remote FSNS, respectively, both before and after applying the present invention to a simple rename task.

The following steps are first applied to all containing directory objects encountered in steps one or two. (/A/B/ is the "containing" directory of the object named /A/B/C/.) Directory renames that are encountered here and have already been applied to the remote FSNS in the propagation of another object are noted. Then, when adding renames to object's rename set, renames are adjusted to account for the fact that the directory rename has already been applied to the remote FSNS. After the directory renames have been applied, the two steps listed below are executed.

1. Place all renames that apply to the unique id of the object in the object's rename set.
2. Place clearance renames on each new name introduced by a rename on the object's rename list.

Step one is achieved by simply searching the local FSNS's rename list for the unique id of the object being propagated.

Step two is achieved by searching the local FSNS's rename list for the current name of the object in the Old-name field. Any objects introduced to the rename set are processed as the original object, subject to containing directory recursion, and steps 1 and 2.

When the local FSNS's rename list is searched (backwards) for an object name, the name being searched for must be adjusted backwards for any directory encountered in the list during the search. For example, starting with D1/X(3) and D1/Y(1) the following names are executing in the local FSNS:

| a) D1/Y → D1/Z | (1) |
|---|---|
| b) D1/ → D2/ | (2) |
| c) D2/X → D2/Y | (3) |

In propagating the object D2/Y(3) from the local FSNS to the remote FSNS, the rename set is assumed to be (b,c) without checking for the clearance problem in step 2. Rename a) is detected by the clearance rename algorithm in step 2. The current name of the object is D2/Y(3). Searching backwards for this name in the Old-name field of the local FSNS's rename list, the directory rename b) is encountered. The name of the file is adjusted to D1/Y which then matches the rename a), yielding a rename set of (a,b,c) for object D2/Y(3).

If an object is renamed in several directories, it is important to detect and recurse on all containing directories. For example, starting with /A/B/X(1) the following renames are executed:

| a) /A/C/ → /A/C2/ | (2) |
|---|---|

| -continued | |
|---|---|
| b) /A/B/X → /A/C2/X | (1) |
| c) /A/C2/X → /A/D/X | (1) | where there exists directories /A/B(3), /A/D(4).

In order for rename b) to succeed in the remote FSNS, rename a) must be applied first. Note that although object (1) is initially contained in directory object (3) it is subsequently contained in directory object (4), and can not be propagated to the remote FSNS without the application of a rename of directory object (2).

The "clearance" problem of renaming an object occurs because the final name of an object undergoing a rename must be available, i.e. not occupied by some other object. For example, if a FSNS has two files names X and Y, a rename of Y and Z, respectively, must be executed in the following order.

| a) Y → Z | (1) |
|---|---|
| b) X → Y | (2) |

The local FSNS now has two files, named Y and Z. Note that rename a) had to be executed before rename b) in order to make available (or "clear") the name Y in the FSNS. Rename a) is considered a "clearance" rename. If object 2 named Y, Y(2), (originally X(2)) is propagated to the remote FSNS, then Y(2)'s rename b) should be applied to the remote FSNS. However, the remote FSNS still has files X(2) and Y(1), and applying rename b) will collide with Y(1), and the propagation will fail. Refer to FIG. 2. The Clearance Rename problem is resolved by the algorithm as follows: Rename b) is placed in object (2)'s rename set in step 1, and rename a) is placed in the rename set because object (2)'s name match's its old-name field.

Directory renames present two problems. First if an object rename is propagated to the remote FSNS before the remote FSNS has received the rename for the directory containing the object, that object rename will fail because it incorporates a directory name not yet defined in the FSNS. Second, once a directory rename has been applied in the remote FSNS, renames of other objects contained in the renamed directory may fail when applied in the remote FSNS because they refer to a directory by its original name, depending on whether or not the renames were executed before or after the directory rename in the local FSNS. In FIG. 3, the rename operates as follows:

| a) D1/Y → D1/Z | (2) |
|---|---|
| b) D1/ → D2/ | (1) |
| c) D2/A → D2/B | (3) |

Originally there were two files D1/Y and D1/A in the local FSNS. This sequence of renames results in D2/Z and D2/B in the local FSNS. If D2/B is propagated first, then its rename c) will fail when applied in the remote FSNS because it incorporates directory D2 in the rename sequence but it is still referred to as being contained in directory D1 in the remote FSNS. In a second scenario, assume that renames b) and c) were successfully propagated to the remote FSNS. In order to propagate object (2) to the remote FSNS, the rename a) would have to be applied in the remote FSNS. But rename a) would fail because it refers to directory (1) by is original name D1, when it is already D2 in the remote FSNS. The Directory Rename problems are resolve by the algorithm as follows: Recursing on containing directories prevents objects renames from being applied before renames on their containing directories have been applied. And, once a directory rename has been applied, all other renames are adjusted forward to account for directory rename.

A rename "conflict" occurs when the same object is renamed in different FSNS's. If the same object is renamed in the local and remote FSNS, then propagation of the object from the local to the remote FSNS will fail because the object in the remote FSNS does not have the original name of the object in local FSNS. In FIG. 4, the rename operates as follows:

| Local FSNS | Remote FSNS |
|---|---|
| a) A → Y (1) | b) A → Z (1) |

When propagating object (1) to the remote FSNS, rename a) will fail because in the remote FSNS object (1) is not named "A". The Rename Conflict problem is resolved as follows: The rename set that would reverse the effect of the renames executed in the remote FSNS, e.g., return the object in the remote FSNS to the object's original name in the local FSNS, is calculated and applied to the remote FSNS. Then, the rename set as calculated in the local FSNS is applied to the remote FSNS.

A rename "collision" occurs when the object is propagated from the local to the remote FSNS. When an object in the local FSNS is renamed to a name occupied by another object in the remote FSNS and this second object does not exist in the local FSNS. For example, object A(1) exists in both the local and remote FSNS, and object (2) exists only in the remote FSNS and is unknown in the local FSNS. In FIG. 5, the following rename is executed:

| Local FSNS | Remote FSNS |
|---|---|
| a) A → B (1) | |

When object (1) is propagated from the local to the remote FSNS, rename a) will fail because it will "collide" with object B(2) in the remote FSNS. The Collision problem is resolved as follows: When applying an object's rename set in the remote FSNS, every rename record's New-name is confirmed not to be occupied by an object in the remote FSNS. Objects that occupy these names are renamed aside to a unique name. If the name is only temporarily occupied by an object in the rename set, then when the name is again available, the original object is renamed back to the name.

Figure 6:
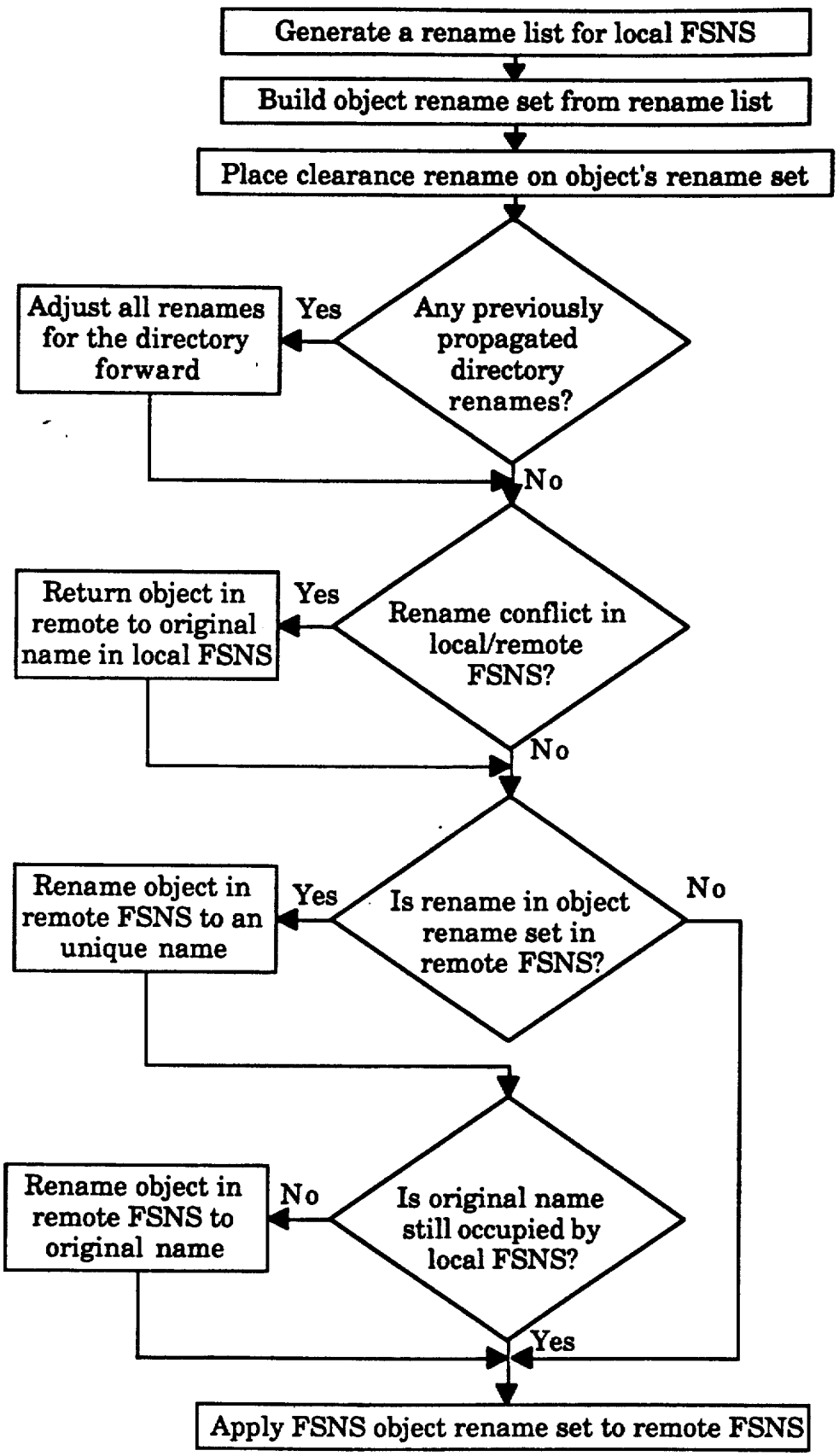
FIG. 6 is a flow diagram illustrating the method of the present invention.

Referring to FIG. 6, a flow diagram illustrating the method of the present invention is illustrated. Specifically, the rename list for objects which have been renamed in the local FSNS is generated in step 1. Then a determination is made in step 2 as to whether any directory renames in the rename list have been previously propagated to the remote FSNS. If not, the object rename set for each renamed object in the local FSNS is built in step 4. Otherwise, the renames are adjusted in step 3 to account for the propagated directory renames and then the object rename set for each renamed object in the local FSNS is built in step 4. In step 5, a determination is made as to whether any renames of objects in the remote FSNS would result in a rename conflict with the propagation of renames from the local FSNS to the remote FSNS. If not, the object rename set is applied to the remote FSNS in step 7. Otherwise, the renamed objects in the remote FSNS which would result in rename conflict are renamed back to their old name in step 6 and then the object rename set is applied to the remote FSNS in step 7. In applying the object rename set to the remote FSNS in step 7, a determination is made in step 8 as to whether any original names of objects in the remote FSNS occupy the new name of a renamed object in the object rename set propagated from the local FSNS. If not, step 12 ends the method. Otherwise, the objects whose original name occupies the new name of the renamed object from the local FSNS is renamed with an unique name in step 9. If the new name is only temporarily occupied by an object in the rename set, as determined in step 10, then the object in the remote FSNS with the unique name is renamed back to its original name in step 11 when the original is no longer occupied in the remote FSNS.

We claim:

1. In a computer networking environment comprising a local file system name space (FSNS) and at least one remote FSNS, said local FSNS containing a plurality of local objects comprising local files and local directories containing other local directories or said local files, each of said at least one remote FSNS containing a plurality of remote objects comprising remote files and remote directories containing other remote directories or said remote files, a method for propagating a rename of local objects from said local FSNS to said at least one remote FSNS, the method comprising the steps of:

generating a rename list for any of said local objects that have been renamed in said local FSNS, said rename list comprising an unique object identification, an old name, and a new name for each renamed local object;

adjusting any of said old names and said new names in said rename list when any local directory containing said renamed local objects has been renamed in said local FSNS and the rename of said any local directory has been propagated to said at least one remote FSNS;

building object rename sets in said local FSNS for said renamed local objects identified by said rename list, each object rename set comprising the unique object identification, the old name, and the new name for its renamed local object;

renaming any of said remote objects that have been renamed in said at least one remote FSNS to an old name when the renamed remote objects are in rename conflict with any of said renamed local objects; and propagating the rename of said renamed local objects to said at least one remote FSNS by renaming said remote objects according to said object sets, said propagating step further comprising the step of renaming any of said remote objects having an original name which occupies the new name of any of said renamed local objects.

2. The method as claimed in claim 1 wherein the step of renaming any of said remote objects having an original name which occupies the new name of any of said renamed local objects comprises the steps of:

renaming said any remote object have an original name which occupies the new name of any of said renamed local objects to an unique name; and renaming said any remote object which has been renamed to said unique name to its original name when its original name is no longer occupied in said at least one remote FSNS.

* * * * *

UNITED STATES PATENT AND TRADEMARK OFFICE
CERTIFICATE OF CORRECTION

PATENT NO.  : 5,237,680
DATED       : August 17, 1993
INVENTOR(S) : Adams et al.

It is certified that error appears in the above-identified patent and that said Letters Patent is hereby corrected as shown below:

In column 8, claim 2 at line 61, please delete " have " and insert -- having --.

Signed and Sealed this

Fourteenth Day of October, 1997

Attest:

BRUCE LEHMAN

*Attesting Officer*    *Commissioner of Patents and Trademarks*